US012732788B2

(12) United States Patent
Opitz

(10) Patent No.: US 12,732,788 B2
(45) Date of Patent: Sep. 8, 2026

(54) METHOD FOR TRAFFIC MANAGEMENT IN A WIRELESS NETWORK SYSTEM

(71) Applicant: Deutsche Telekom AG, Bonn (DE)

(72) Inventor: Johannes Opitz, Cologne (DE)

(73) Assignee: DEUTSCHE TELEKOM AG, Bonn (DE)

( * ) Notice: Subject to any disclaimer, the term of this patent is extended or adjusted under 35 U.S.C. 154(b) by 312 days.

(21) Appl. No.: 18/577,283

(22) PCT Filed: Jul. 14, 2022

(86) PCT No.: PCT/EP2022/069781
§ 371 (c)(1),
(2) Date: Jan. 8, 2024

(87) PCT Pub. No.: WO2023/285612
PCT Pub. Date: Jan. 19, 2023

(65) Prior Publication Data

US 2024/0314535 A1 Sep. 19, 2024

(30) Foreign Application Priority Data

Jul. 15, 2021 (EP) .................................... 21185815

(51) Int. Cl.
*H04W 8/02* (2009.01)

(52) U.S. Cl.
CPC .................................... *H04W 8/02* (2013.01)

(58) Field of Classification Search
CPC ....... H04W 8/02; H04W 8/18; H04W 12/088; H04W 76/12
See application file for complete search history.

(56) References Cited

U.S. PATENT DOCUMENTS

| | | | |
|---|---|---|---|
| 8,767,544 | B1 | 7/2014 | Khanka et al. |
| 10,674,348 | B1 | 6/2020 | Tandon et al. |

(Continued)

FOREIGN PATENT DOCUMENTS

| | | | |
|---|---|---|---|
| EP | 3189486 A1 | 7/2017 | |
| JP | 2013243476 A | 12/2013 | |

(Continued)

OTHER PUBLICATIONS

Motorola Mobility, “Reducing HLR/HSS traffic for roaming MTC devices”, 3GPP Draft; S2-105728_CRREL10_23401_NIMTC, 3rd Generation Partnership Project (3GPP), Mobile Competence Centre ; 650, Route Des Lucioles ; F-06921 Sophia-Antipolis Cedex ; France, vol. {0} SA WG2, No. {0} Jacksonville; Nov. 15, 2010, Nov. 9, 2010 (Nov. 9, 2010), XP050523075, pp. 1-3.

(Continued)

*Primary Examiner* — Margaret G Webb
(74) *Attorney, Agent, or Firm* — LEYDIG, VOIT & MAYER, LTD.

(57) ABSTRACT

A method for traffic management in a wireless network system includes: identifying, by the wireless network system, a mobile device that is outside its home network and accepted into the wireless network system based on at least one predetermined parameter. The method further includes: reducing, by the wireless network system, a data transfer rate allowed for the identified mobile device, wherein reducing the data transfer rate allowed for the identified mobile device comprises reducing a data transfer rate of payload data; and/or preventing, by the wireless network system, communication between the identified mobile device and the home network of the mobile device, wherein preventing communication between the identified mobile device and the home network of the mobile device comprises blocking user data within a GPRS tunneling protocol (GTP) firewall.

17 Claims, 4 Drawing Sheets identifying a mobile device that is outside its home network and accepted into the wireless network system based on at least one predetermined parameter — 41 reducing the data transfer rate allowed for the identifyed mobile device and/or preventing the communication between the identifyed mobile device and the home network of the mobile device — 42

(56) References Cited

U.S. PATENT DOCUMENTS

| | | | | |
|---|---|---|---|---|
| 2012/0076125 | A1 | 3/2012 | Kopplin | |
| 2013/0198373 | A1* | 8/2013 | Zalmanovitch | H04W 8/186 709/224 |
| 2014/0349641 | A1* | 11/2014 | Jiang | H04W 4/029 455/432.3 |
| 2015/0085664 | A1 | 3/2015 | Sachdev et al. | |
| 2015/0382241 | A1* | 12/2015 | Ophir | H04W 8/18 370/328 |
| 2017/0142571 | A1* | 5/2017 | Skög | H04W 48/16 |
| 2018/0077564 | A1 | 3/2018 | Xu et al. | |
| 2019/0124046 | A1 | 4/2019 | Mehra | |
| 2019/0190996 | A1* | 6/2019 | Sabeur | H04W 36/00226 |
| 2020/0045519 | A1 | 2/2020 | Raleigh et al. | |
| 2021/0203636 | A1 | 7/2021 | Kumar et al. | |
| 2024/0314535 | A1 | 9/2024 | Opitz | |

FOREIGN PATENT DOCUMENTS

| | | | |
|---|---|---|---|
| WO | WO 2014/185987 | A1 | 11/2014 |
| WO | WO 2015027246 | A1 | 2/2015 |

OTHER PUBLICATIONS

Huawei et al, "Discussion and proposal for CN based MTC overload control", 3GPP Draft; S2-103498, 3rd Generation Partnership Project (3GPP), Mobile Competence Centre ; 650, Route Des Lucioles ; F-06921 Sophia-Antipolis Cedex ; France, vol. {0} SA WG2, No. {0} Brunstad; Sep. 3, 2010, Aug. 24, 2010 (Aug. 25, 2010), XP050458546, pp. 1-4.

3GPP, "3rdGeneration Partnership Project; Technical Specification Group Services and System Aspects; System Improvements for Machine-Type Communications; (Release 10)", vol. {0} TSGX, May 25, 2011 (May 25, 2011), pp. 1-80, 3GPP2 Draft; 23888-100, 3rd Generation Partnership Project 2, 3GPP2, 2500 Wilson Boulevard, Suite 300, Arlington, Virginia 22201 ; USA.

LG Electronics Inc, "Handling of Roaming MTC Devices", 3GPP Draft; R2-106606 MTC Roaming, 3rd Generation Partnership Project (3GPP), Mobile Competence Centre ; 650, Route Des Lucioles ; F-06921 Sophia-Antipolis Cedex ; FRANCE, vol. {0} RAN WG2, No. {0} Jacksonville, USA; Nov. 15, 2010, Nov. 9, 2010 (Nov. 9, 2010), XP050492372, pp. 1-2.

3GPP et al., "3rd Generation Partnership Project; Technical Specification Group Services and System Aspects; Study on Machine-Type Communications (MTC) and other mobile data applications communications enhancements (Release 12)", Dec. 20, 2013 (Dec. 20, 2013), pp. 1-152, 3GPP TR 23.887 V12.0.0, 3rd Generation Partnership Project (3GPP), Mobile Competence Centre ; 650, Route Des Lucioles ; F-06921 Sophia-Antipolis Cedex ; France.

Sierra Wireless, "Broadcasting MTC Group Access Control for Overload Control," 3GPP TSG SA WG2, Meeting #79, S2-102320, May 10-14, 2010, pp. 1-5, V11.0.0,2012, 3.3GPP Tr 23.888, Kyoto, Japan.

3GPP, 3rdGeneration Partnership Project; Technical Specification Group Services and System Aspects; System Improvements for Machine-Type Communications (MTC); (Release 11), Sep. 2012, vol. 11.0.0, pp. 1-3, 3GPP TR 23.888.

* cited by examiner

METHOD FOR TRAFFIC MANAGEMENT IN A WIRELESS NETWORK SYSTEM

CROSS-REFERENCE TO PRIOR APPLICATIONS

This application is a U.S. National Phase application under 35 U.S.C. § 371 of International Application No. PCT/EP2022/069781, filed on Jul. 14, 2022, and claims benefit to European Patent Application No. EP 21185815.4, filed on Jul. 15, 2021. The International Application was published in English on Jan. 19, 2023 as WO 2023/285612 A1 under PCT Article 21(2).

FIELD

The present disclosure relates to method for traffic management in a wireless network system and in particular to traffic management in roaming scenarios.

BACKGROUND

The increasing number of networked devices associated with the "Internet of Things (IoT)" has led to a sharp rise in these devices in recent years. It can still be assumed that the number of these devices will continue to grow exponentially in the future. All of these devices have in common that they require a connection to the internet to operate.

Many of the companies producing these "networked" devices for the international market are requesting international/global connectivity from network operators to support these applications. This connectivity can be provided through various means (fixed, mobile, WiFi, LoRa, etc.). Particularly in the case of global connectivity, this often takes place via mobile communications and thus ultimately via roaming. GlobalData forecasts more than 11 billion devices worldwide in 2024, of which in turn more than 3.1 billion devices will be supplied with connectivity via mobile communications (mainly via 2G, 3G, 4G and LTE-M).

In contrast to "normal" roaming, where customers of third-party network operators are generally only temporarily on the networks of other network operators, many IoT devices are permanently on third-party networks.

SUMMARY

In an exemplary embodiment, the present invention provides a method for traffic management in a wireless network system. The method includes: identifying, by the wireless network system, a mobile device that is outside its home network and accepted into the wireless network system based on at least one predetermined parameter. The method further includes: reducing, by the wireless network system, a data transfer rate allowed for the identified mobile device, wherein reducing the data transfer rate allowed for the identified mobile device comprises reducing a data transfer rate of payload data; and/or preventing, by the wireless network system, communication between the identified mobile device and the home network of the mobile device, wherein preventing communication between the identified mobile device and the home network of the mobile device comprises blocking user data within a GPRS tunneling protocol (GTP) firewall.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
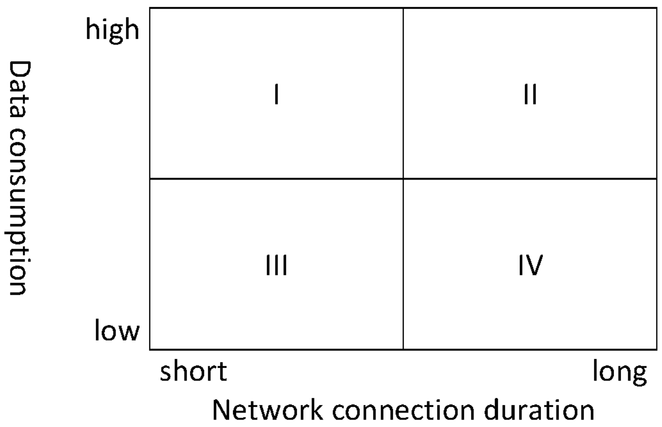
FIG. 1 is a schematic illustration of data consumption versus network connection duration of a roaming mobile device according to an embodiment of the present disclosure.

Exemplary embodiments of the present invention provide a method for traffic management of mobile devices in wireless networks.

The present disclosure provides a method for traffic management in a wireless network system, the method comprising: identifying a mobile device that is outside its home network and accepted into the wireless network system based on at least one predetermined parameter; and reducing the data transfer rate allowed for the identified mobile device and/or preventing the communication between the identified mobile device and the home network of the mobile device.

The step of identifying a mobile device that is outside its home network may be performed on an external server. That is, it is preferred that the respective at least one predetermined parameter is received and analyzed in connection with a particular mobile device at an external server which is configured to identify a mobile device that is outside its home network based on at least one predetermined parameter.

It is further preferred that the external server sends a respective signal to the network entities to be described below to reduce the data transfer rate. However, the present invention is not limited by the specific entity of the communication network that may execute the reduction of the data transfer rate. That is, the reduction of the data transfer rate may be implemented on various network entities (network nodes), e.g. the ones establishing the GTP tunnel (see description below). It is further possible to implement the method on a new network element to be added to the existing network structure. This is true for both, the above mentioned identification and/or the reduction of the data transfer rate.

The GPRS Tunneling Protocol (GTP) is the tunneling protocol to carry the data traffic.

GTP is used to establish a GTP tunnel, for user equipment, between a Serving Gateway (S-GW) and Packet Data Network Gateway (P-GW), and an S-GW and Mobility Management Entity (MME). The GTP tunnel is a channel between two GPRS support nodes through which two hosts exchange data. The S-GW receives packets from the user equipment and encapsulates them within a GTP header before forwarding them to the P-GW through the GTP tunnel. When the P-GW receives the packets, it decapsulates them and forwards them to the external host.

GTP comprises the following separate protocols:

i) GTP-C— Performs signaling between the S-GW and P-GW in the core GPRS network to activate and deactivate subscriber sessions, adjust the quality of service parameters, or update sessions for roaming subscribers who have arrived from another S-GW. GTP-C supports transport of control packets.

ii) GTP-U— Transports user data within the core GPRS network and between the radio access network (RAN) and the core network. This is the payload—reducing/throttling the GTP-U will reduce only the data-speed but nor preventing the communication of the device. Stopping the device to communicate will need next to reducing the GTP-U down to "zero" also the blocking of the GTP-C.

Various embodiments may preferably implement the following features.

Preferably, reducing the data transfer rate comprises reducing the data transfer rate of the payload data, i.e. the part of the transmitted data that is the actual intended message (communication data). In addition, reducing the data transfer rate comprises reducing the data transfer rate of the header data, i.e. the signalling data.

In contrast, reducing the data transfer rate of only the header data, i.e. the signalling data, may not be advantageous. In particular, by reducing the data transfer rate of at least the payload data, the data transfer of the roaming device is significantly restricted and the visiting network can be significantly relieved from the overall data transfer requested by the roaming device. In contrast, only restricting the header data may not result in a significant relief from the overall data transfer requested by the roaming device.

Preferably, preventing the communication between the identified mobile device and the home network of the mobile device comprises: prohibiting of forwarding of any messages from/to the mobile device to/from the home network by the wireless network system.

Preferably, the at least one parameter comprises at least one of: an access point name, an international mobile equipment identity, a type allocation or approval code, a media access control address, a mobile subscriber integrated service digital network number, an international mobile subscriber identity, a radio access technology, an internet protocol address, or at least one predetermined traffic data of the mobile device.

Preferably, the at least one predetermined traffic data comprises at least one of: data consumption, network connection duration, SMS activity data, voice call activity data, location update messages, or login behavior of the mobile device.

Preferably, the network connection duration is a previously stored network connection duration associated with the mobile device. Once the GTP-C is established the duration starts to count irrespectively of whether there is a payload running through the tunnel. The data of the duration is stored in the Packet-Gateway.

Preferably, identifying a mobile device that is outside its home network further comprises identifying a mobile device that has a data consumption below a predetermined threshold.

Preferably, identifying a mobile device that is outside its home network comprises identifying a mobile device that has a network connection duration below a predetermined threshold.

Preferably, identifying a mobile device that is outside its home network comprises identifying a mobile device that has a ratio of data consumption to network connection duration below a predetermined threshold.

Preferably, the method further comprises a location update procedure before the identifying a mobile device that is outside its home network.

Preferably, the location update procedure comprises receiving a location update request message from the mobile device and sending a location update accept message to the mobile device.

Preferably, preventing the communication between the identified mobile device and the home network of the mobile device comprises blocking user data within a GPRS tunneling protocol (GTP) firewall.

Preferably, blocking user data within a GTP firewall comprises blocking a mobile application part (MAP) cancel location message.

Preferably, preventing the communication between the identified mobile device and the home network of the mobile device comprises removing the access point name of the identified mobile device from the wireless network system.

Preferably, the mobile device carries a subscriber identity module (SIM) card. That is, the mobile device may be a mobile terminal, e.g. a cell phone. However, the present disclosure is not restricted thereto. In particular, the mobile phone may be any device that is able to change location and having a SIM card. Also heavy objects like shipment containers or the like are regarded as mobile devices, because they can change location by being transported with a ship. That is, only objects that may not at all be able to change location and/or may not at all carry a SIM card may not be regarded as mobile devices. It should encompass all devices, modules or even chipsets that can establish a mobile connection to a mobile network.

In addition, the expression "the mobile device carrying a SIM card" may include SIM cards that are physically placed on or in the mobile device or SIM cards that are connected (wired or wireless) to the mobile device (e.g. eSIMs).

The present disclosure also relates to a computer program product comprising a computer-readable program medium code stored thereupon, the code, when executed by a processor, causing the processor to implement a method as described in the foregoing.

The exemplary embodiments disclosed herein are directed to providing features that will become readily apparent by reference to the following description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure.

Thus, those of ordinary skill in the art will understand that the methods and techniques disclosed herein present various steps or acts in a sample order, and the present disclosure is not limited to the specific order or hierarchy presented unless expressly stated otherwise.

The above and other aspects and their implementations are described in greater detail in the drawings, the descriptions, and the claims.

FIG. 1 shows the data consumption versus network connection duration, wherein the data consumption may vary from low to high and the network connection duration may vary from short to long. The graph of FIG. 1 is divided into four segments I-IV, wherein each segment indicates a relation between data consumption and network connection duration. In particular, the first segment I indicates a high data consumption and a short network connection duration. The second segment II indicates a high data consumption and a long network connection duration. The third segment III indicates a low data consumption and a short network connection duration. The fourth segment IV indicates a low data consumption and a long network connection duration. It should be appreciated that the division in four segments is merely for illustration purposes. Other divisions (e.g. more than four segments) may be applied in accordance with the present disclosure.

More particularly, it is undisputed that the number of IoT devices will increase by leaps and bounds in the coming years. However, due to some specific peculiarities of these applications, mobile operators may have only limited possibilities to take this increase into account in their respective strategic network planning. In contrast to conventional applications, in this case only the manufacturer of the respective devices may have an approximate knowledge of the countries in which these devices will be used; however, the respective local regions in these countries in which the devices will ultimately be used are often also beyond their knowledge.

The network technology (2G, 3G, 4G, LTE-M, 5G or NB-IoT) used by said devices may also not be known—at least not if the devices support all these listed technologies—so-called multi-mode devices. As soon as these devices are shipped abroad, they register in a foreign mobile network when activated. The network is usually selected on the basis of roaming agreements and default settings on the SIM card by the mobile communications company that provided the SIM card (e.g. using a preferred partner list on the SIM card or steering the device using signalling based (network based) steering methods). As soon as the device has logged into the respective foreign mobile network, it will "obtain" connectivity there as long as it is connected to the network.

The mobile network operators involved incur different costs in the process: While the sending home operator must pay roaming charges to the local network operator, the local network operator has (variable) network costs that must be covered. The profitability of the business for the receiving network operator thus depends quite significantly on data consumption (roaming charges) and the duration of the network connection (network costs) (see FIG. 1).

In particular the usage scenarios I and II in FIG. 1 with high data usage by the SIM card of the foreign mobile network operator are cost-covering or profitable. Here, the roaming charges that the network operator can bill to its roaming partner are sufficient to cover the variable network costs and, if necessary, to generate a profit over and above this. If data usage is low and billing is based only on the data consumed, on the other hand, these SIM cards are generally a loss-making business for the host network operator (scenarios III and IV in FIG. 1). Here, the revenues generated by roaming are not sufficient to cover the monthly variable network costs. These "SIM costs" (VLR, PGW, signaling, RAN) can amount to several Euro Cents per card a month. In other words, the mere "dwelling" of cards inevitably leads to undercoverage in the visited mobile network.

Furthermore, there is the risk of a (partial) network breakdown due to a so-called signaling storm, in which a very large number of roaming SIM cards are in a foreign network and make contact with their Home Location Register (HLR) at the same time. Examples of such network break downs, in which the customers of the visited network are then also no longer able to use services, are happening more often recently. There are cases where the SIM cards of 50,000 smart containers on a cargo ship tried to dial into the local network at the same time when entering the shores and the roaming partner's network collapsed as a result. It therefore remains to be said that it is doubly not in the roaming partner's interest to accept these loss-making SIM cards in uncontrollable quantities in its network.

In view of the above, the network operator of the network to be visited may send a so-called "Roaming Not Allowed" signal during the first login attempt of the foreign SIM card. If the GSM module "understands" this command, the network on the SIM card is blocked until the entry on the SIM card is overwritten by the home network operator.

Unfortunately, the modules that have low data usage are also equipped with rather cheap GSM modules, so most devices cannot process the "Roaming Not Allowed" command and continue to try to log into the network. Should the visited network operator actively prevent network access for these devices, this will only lead to a significant increase in signaling requests. So it comes to the case that protecting against too much signaling combined with trying to remove the cards from the own network will lead to even more signaling and thus to a potential network outage.

Cancelling the entire roaming relationship would also not be an effective remedy, because on the one hand this affects the service/quality of the "normal" and own customers and on the other hand exactly these cards will continue to start a network request. Thus, nothing is gained—on the contrary, if the cards are rejected, the problem only gets bigger.

Many network operators are not even aware of this increasing challenge and only recognize the problem when a signaling storm has occurred and they have to deal with (partial) network failures. These network operators are thus faced with a dilemma: if they allow the loss-making cards into their network, they ideally only make losses; if, on the other hand, they reject them, this can lead to considerable impairment of their own network.

According to embodiments of the present disclosure, not prohibited/restricted by any standardization, these devices may be allowed to log into the network and also transmit the message sent by the device accordingly—"log-in successful" to the HLR of the network operator. Then it could be: throttle the data flow of the device, so that there will be a service degradation and/or prevent further communication between the home network operator and these particular devices.

While in the first case (throttle the data flow), it is still possible for the sending network operator to redirect the devices to another roaming network, this is no longer possible in the second case (prevent communication with home network). All "commands" from the network operator (such as MAP Cancel Location, etc.) are not forwarded. Also messages from the device (e.g. a location update) are not forwarded to the home network.

The device is thus cut off from the home network and can no longer be reached by the home network operator. One way to get this device back "on the network" would be via a manual network selection on site and the selection of another network. However, this option may fail due to the distance and the large number of devices installed.

Next, the identification of such a device, i.e. a device that may be "unwanted" in the visiting network, is described in accordance with an embodiment of the present disclosure.

The identification of these devices may be done in the mobile network operators' (MNOs') systems based on the following parameters:

1) Access point name (APN) of the gateway between a backbone of an MNO's network (e.g., GPRS, 3G, 4G or 5G) and an external packet-based data network.
2) International Mobile Equipment Identity (IMEI): This consists of 15 digits and is unique for every device worldwide—anyone who knows the number can therefore clearly assign a smartphone or other device. There is also the Type Allocation or Approval Code (TAC), which is usually a 6-digit code for identifying cell phones and smartphones. The MAC address (media access control address) is the hardware address of each network adapter, which serves as a unique identifier of the device in a computer network.
3) The Mobile Subscriber Integrated Services Digital Network Number or Mobile Station Integrated Services Digital Network Number (MSISDN). This is a globally unique number that callers dial to reach a mobile subscriber.
4) International Mobile Subscriber Identity (IMSI), this is a mobile communications number for the unique identification of network subscribers in mobile communications networks (internal subscriber identifier). In addition to other data, the IMSI is stored on the SIM. It is assigned worldwide only once per SIM by the mobile network operators.
5) The IP address (Internet Protocol). Every computer, server, device, cell phone, etc. that is connected to the Internet is assigned a globally unique IP address. It is then used for communication of the device with a server.

In an embodiment, identifying the mobile device is based on selected parameters mentioned above, e.g. IMSI, IMEI, MSISDN as well as further traffic data such as data consumption, SMS and voice activities as well as login behavior of the devices in the network. These "patterns" may be used to detect other devices in the same IMSI range if the devices do not transmit certain characteristics (APN, IMEI, etc.).

It has to be appreciated that the exact combination of parameters may vary in accordance with current demands. That is, the present disclosure is not restricted to the above mentioned parameters nor is the present disclosure restricted to the exact method of identification. Rather, all parameters available at the time of implementation may be used to identify said devices. In addition, definition of "the devices" that are identified may also vary. That is, the network operator may define its individual parameters and/or thresholds that are suitable for identifying respective devices, i.e. devices that the network operator may consider as "unwanted" devices that may be subject to the subsequent method as described herein.

Figure 2:
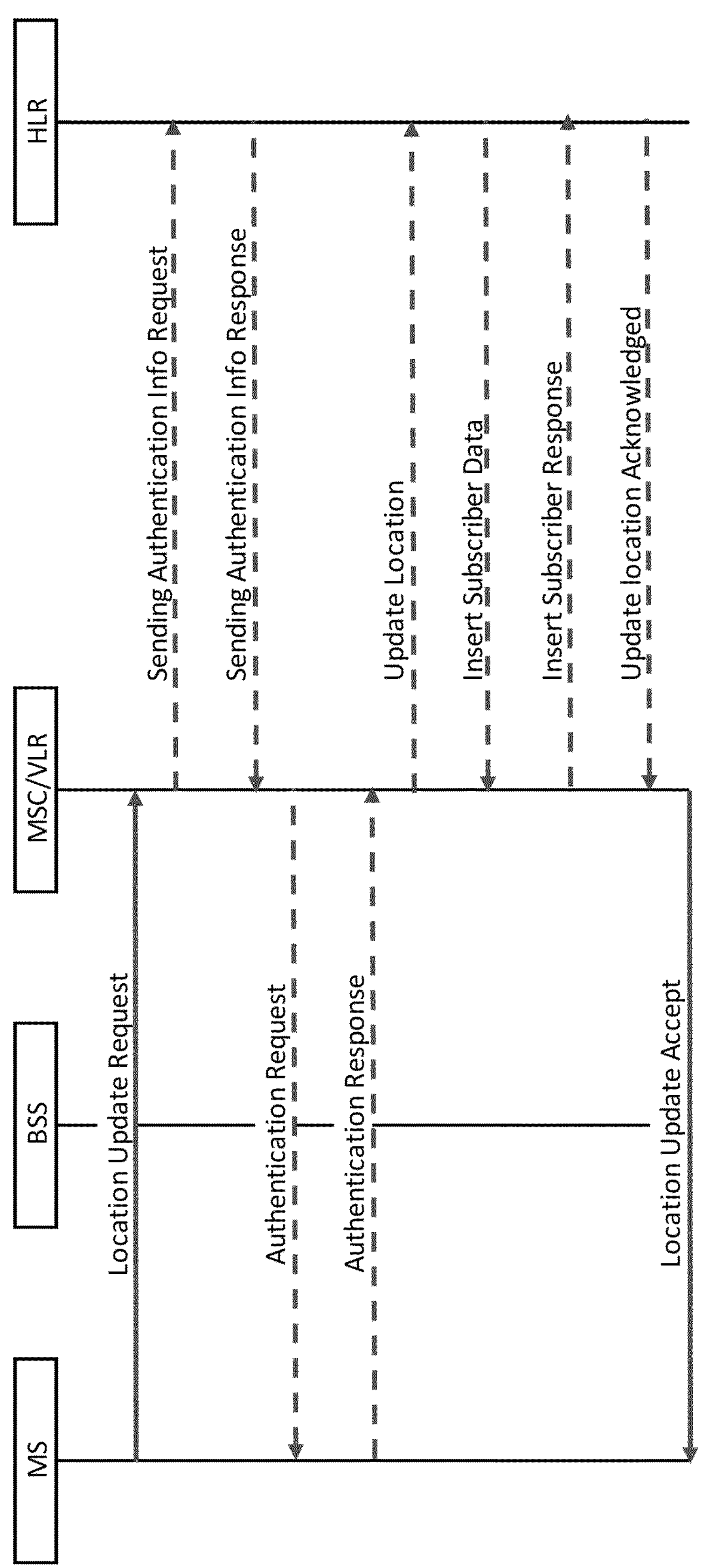
FIG. 2 is a signaling scheme of a location update procedure in 2G/3G according to an embodiment of the present disclosure.

With reference to FIG. 2 a signaling scheme of a location update procedure in 2G/3G is exemplarily described in the following. In the case of roaming, the terminal device of a network operator (HPMN) connects to the foreign mobile network (VPMN). The foreign mobile network recognizes that an IMSI of a foreign network wants to register and sends a location update request to this foreign network. After an interaction between visitor location register (VLR) & home location register (HLR), this request is confirmed with a Location Update Accept. The mobile subscriber's (MS) terminal can then roam in the foreign network.

In this first Location Update (LU), only the IMSI and the IMEI are "transmitted"—another important piece of information—but not the APN. Therefore, the "unwanted" devices are also provided with an LU request and an authentication response in the first step. This can then be used both individually and in their entirety for identification from an interaction of APN, IMEI/TAC code and based on the above described identification of mobile devices.

That is, according to an embodiment of the present disclosure, the devices are automatically identified via unique parameters and the data are subsequently and automatically throttled as described herein.

In the other case—prevention of communication with the home network—the devices are registered in the same way as in FIG. 2. If these devices then establish communication with their home network, this communication link is established via the GPRS Tunneling Protocol (GTP). The GTP-C is used to transport control information such as the construction and dismantling of tunnels, and the GTP-U is used to transport user data.

Figure 3:
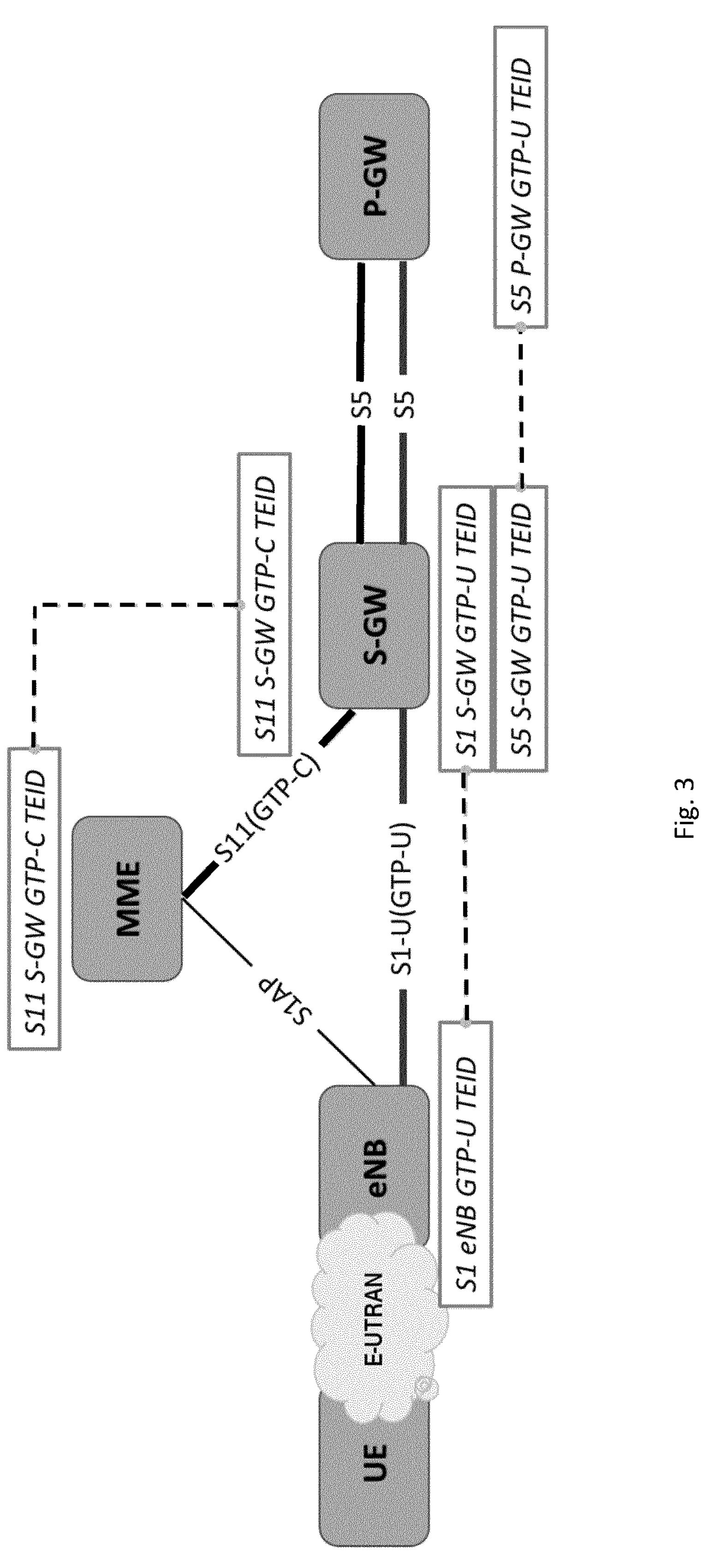
FIG. 3 is a schematic illustration of a GPRS Tunneling Protocol according to an embodiment of the present disclosure.

Both the GTP-U and the GTP-C usually run through the GTP firewalls at MNOs. Such a scenario is schematically illustrated in FIG. 3.

In the GTP firewall, the Tunnel End Point Identifier (TEID) is then flagged in the GTP-C message for the specific devices (the identification is done analogously as described above via the features IMSI, IMEI, APN, etc.) in order to then prevent the GTP-U. In this case, the data tunnel is established, but the corresponding adjustments in the firewall prevent the data exchange with the home network.

That is, according to an embodiment of the present disclosure, the devices are automatically identified via unique parameters and subsequently the transport of user data (GTP-U) in the GTP firewall for these "special" devices is prevented.

Another way to prevent these devices from communicating is to remove their Internet APNs from the respective systems of the roaming network visited. As soon as these dedicated APNs are no longer supported by the network, no more sessions can be established.

The "communication" of these devices would thus be prevented. The devices would then have to be rerouted to another mobile network by the home network operator via a "Cancel Location".

That is, according to an embodiment of the present disclosure, the devices are automatically identified via unique parameters and subsequently the dedicated APNs for only these "special" devices on the network side are removed.

Figure 4:
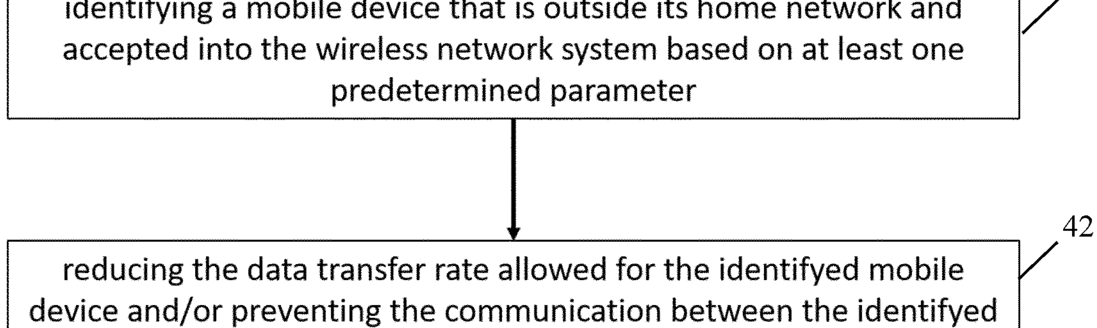
FIG. 4 is a flowchart of a method according to an embodiment of the present disclosure.

FIG. 4 is a flowchart of a method according to an embodiment of the present disclosure. The method shown in FIG. 4 comprises the following steps: Step 41: Identifying a mobile device that is outside its home network and accepted into the wireless network system based on at least one predetermined parameter.

Step 42: Reducing the data transfer rate allowed for the identified mobile device and/or preventing the communication between the identified mobile device and the home network of the mobile device.

In an embodiment, reducing the data transfer rate comprises reducing the data transfer rate of the payload data, i.e. the part of the transmitted data that is the actual intended message (communication data).

In an embodiment, reducing the data transfer rate may comprise reducing the data transfer rate of the payload data and the header data, i.e. the signalling data.

However, reducing the data transfer rate of only the header data, i.e. the signalling data, may not be advantageous. In particular, by reducing the data transfer rate of at least the payload, the data transfer of the roaming device is significantly restricted and the visiting network can be significantly relieved from the overall data transfer requested by the roaming device. In contrast, only restricting the header data may not result in a significant relief from the overall data transfer requested by the roaming device.

In an embodiment, preventing the communication between the identified mobile device and the home network of the mobile device comprises: prohibiting of forwarding of any messages from/to the mobile device to/from the home network by the wireless network system.

In an embodiment, the at least one parameter comprises at least one of: an access point name, an international mobile equipment identity, a type allocation or approval code, a media access control address, a mobile subscriber integrated service digital network number, an international mobile subscriber identity, a radio access technology, an internet protocol address, or at least one predetermined traffic data of the mobile device.

In an embodiment, the at least one predetermined traffic data comprises at least one of: data consumption, network connection duration, SMS activity data, voice call activity data, location update messages, or login behavior of the mobile device.

In an embodiment, the network connection duration is a previously stored network connection duration associated with the mobile device.

In an embodiment, the network connection duration may be a single duration of a network connection of the mobile device (a short signaling burst) or a total duration of a network connection of the mobile device during the time the mobile device is present in the visited network.

In an embodiment, such network connection duration (or other parameters) may be stored is a database in associated with the mobile device and be used for the identification process when the mobile device may try to reconnect to the visited network at a later time, i.e. when the mobile device returns after having left the coverage of the visited network.

In an embodiment, identifying a mobile device that is outside its home network comprises identifying a mobile device that has a data consumption below a predetermined threshold.

In an embodiment, identifying a mobile device that is outside its home network comprises identifying a mobile device that has a network connection duration below a predetermined threshold.

In an embodiment, identifying a mobile device that is outside its home network comprises identifying a mobile device that has a ratio of data consumption to network connection duration below a predetermined threshold.

In an embodiment, the method further comprises a location update procedure before the identifying a mobile device that is outside its home network.

In an embodiment, the location update procedure comprises receiving a location update request message from the mobile device and sending a location update accept message to the mobile device.

In an embodiment, preventing the communication between the identified mobile device and the home network of the mobile device comprises blocking user data within a GPRS tunneling protocol (GTP) firewall.

In an embodiment, blocking user data within a GTP firewall comprises blocking a mobile application part (MAP) cancel location message.

In an embodiment, preventing the communication between the identified mobile device and the home network of the mobile device comprises removing the access point name of the identified mobile device from the wireless network system.

In an embodiment, the mobile device carries a subscriber identity module, (e)SIMcard.

In view of the present disclosure and from the point of view of the network operator, the following advantages may be achieved:

1) The receiving networks may effectively protect themselves from signaling storms as the communication of these devices with their home network is cut off.
2) Furthermore, one may oblige the home network operator to sign a so-called "No-Harm Network Agreement", in which the sending network operator undertakes to program the SIM cards/devices in such a way that signaling storms will no longer occur.
3) The home network operator may also be obliged to use the narrow-band IoT networks set up for such applications and not the 2G, 3G and 4G networks.

The embodiments described above provide an efficient way to "actively" remove devices from the network that is compatible with the current GSMA standards. In particular, the embodiments according to the present disclosure may protect networks from devices that can expose networks to a signaling storm.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient way of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A skilled person would further appreciate that any of the various illustrative logical blocks, units, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software unit"), or any combination of these techniques.

To clearly illustrate this interchangeability of hardware, firmware and software, various illustrative components, blocks, units, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, unit, etc. can be configured to perform one or more of the functions described herein. The term "configured to" or "configured for" as used herein with respect to a specified operation or function refers to a processor, device, component, circuit, structure, machine, unit, etc. that is physically constructed, programmed and/or arranged to perform the specified operation or function.

Furthermore, a skilled person would understand that various illustrative logical blocks, units, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, units, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein. If implemented in software, the functions can be stored as one or more instructions or code on a computer-readable medium. Thus, the steps of a method or algorithm disclosed herein can be implemented as software stored on a computer-readable medium.

Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "unit" as used herein, refers to software, firmware, hardware, and any combination of these elements for performing the associated functions described herein. Additionally, for purpose of discussion, the various units are described as discrete units; however, as would be apparent to one of ordinary skill in the art, two or more units may be combined to form a single unit that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable manner for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for traffic management in a wireless network system, the method comprising:

identifying, by the wireless network system, a mobile device that is outside its home network and accepted into the wireless network system based on at least one predetermined parameter, wherein identifying the mobile device that is outside its home network comprises:

identifying a mobile device that has at least one of: a data consumption, a network connection duration, or a ratio of data consumption to network connection duration below a respective predetermined threshold;

wherein the method further comprises:

reducing, by the wireless network system, a data transfer rate allowed for the identified mobile device, wherein reducing the data transfer rate allowed for the identified mobile device comprises reducing a data transfer rate of payload data; and/or preventing, by the wireless network system, communication between the identified mobile device and the home network of the mobile device, wherein preventing communication between the identified mobile device and the home network of the mobile device comprises blocking user data within a general packet radio service (GPRS) tunneling protocol (GTP) firewall.

2. The method of claim 1, wherein the method comprises preventing communication between the identified mobile device and the home network of the mobile device; and wherein preventing communication between the identified mobile device and the home network of the mobile device comprises: prohibiting, by the wireless network system, of forwarding of any messages from the mobile device to the home network and to the mobile device from the home network.

3. The method of claim 1, wherein the at least one predetermined parameter comprises at least one of:

an access point name,
an international mobile equipment identity,
a type allocation or approval code,
a media access control address,
a mobile subscriber integrated service digital network number,
an international mobile subscriber identity,
a radio access technology,
an internet protocol address, or
predetermined traffic data of the mobile device.

4. The method of claim 1, wherein the at least one predetermined parameter comprises predetermined traffic data of the mobile device, wherein the predetermined traffic data comprises at least one of:

data consumption,
network connection duration,
short message service (SMS) activity data,
voice call activity data,
location update messages, or
login behavior of the mobile device.

5. The method of claim 1, wherein the at least one predetermined parameter comprises predetermined traffic data of the mobile device, wherein the predetermined traffic data comprises network connection duration, and wherein the network connection duration is a previously stored network connection duration associated with the mobile device.

6. The method of claim 1, wherein identifying the mobile device that is outside its home network further comprises identifying a mobile device that has a data consumption below a predetermined threshold.

7. The method of claim 1, wherein identifying the mobile device that is outside its home network comprises identifying a mobile device that has a network connection duration below a predetermined threshold.

8. The method of claim 1, wherein identifying the mobile device that is outside its home network comprises identifying a mobile device that has a ratio of data consumption to network connection duration below a predetermined threshold.

9. The method of claim 1, further comprising:

performing a location update procedure before identifying the mobile device that is outside its home network.

10. The method of claim 9, wherein the location update procedure comprises:

receiving a location update request message from the mobile device; and sending a location update accept message to the mobile device.

11. The method of claim 1, wherein the method comprises preventing communication between the identified mobile device and the home network of the mobile device; and wherein blocking user data within the GTP firewall comprises blocking a mobile application part (MAP) cancel location message.

12. The method of claim 1, wherein the method comprises preventing communication between the identified mobile device and the home network of the mobile device; and wherein preventing communication between the identified mobile device and the home network of the mobile device comprises removing an access point name of the identified mobile device from the wireless network system.

13. The method of claim 1, wherein the mobile device carries a subscriber identity module (SIM) card.

14. A non-transitory computer-readable medium having processor-executable instructions stored thereupon, wherein the processor-executable instructions, when executed, facilitate performance of the following:

identifying a mobile device that is outside its home network and accepted into a wireless network system based on at least one predetermined parameter, wherein identifying the mobile device that is outside its home network comprises:

identifying a mobile device that has at least one of: a data consumption, a network connection duration, or a ratio of data consumption to network connection duration below a respective predetermined threshold;

wherein the processor-executable instructions, when executed, further facilitate performance of the following:

reducing a data transfer rate allowed for the identified mobile device, wherein reducing the data transfer rate allowed for the identified mobile device comprises reducing a data transfer rate of payload data; and/or preventing communication between the identified mobile device and the home network of the mobile device, wherein preventing communication between the identified mobile device and the home network of the mobile device comprises blocking user data within a GPRS tunneling protocol (GTP) firewall.

15. The non-transitory computer-readable medium of claim 14, wherein identifying the mobile device that is outside its home network comprises identifying a mobile device that has a data consumption below a predetermined threshold.

16. The non-transitory computer-readable medium of claim 14, wherein identifying the mobile device that is outside its home network comprises identifying a mobile device that has a network connection duration below a predetermined threshold.

17. The non-transitory computer-readable medium of claim 14, wherein identifying the mobile device that is outside its home network comprises identifying a mobile device that has a ratio of data consumption to network connection duration below a predetermined threshold.

* * * * *